(No Model.)

H. PRÉFONTAINE.
Torch.

No. 233,163. Patented Oct. 12, 1880.

Witnesses
Geo. S. Dexter
Charles S. Bruntnall

Inventor
Herménégilde Préfontaine
by W. E. Hagan — his —
attorney —

N. PETERS, PHOTO-LITHOGRAPHER, WASHINGTON, D. C.

UNITED STATES PATENT OFFICE.

HERMÉNÉGILDE PRÉFONTAINE, OF TROY, NEW YORK.

TORCH.

SPECIFICATION forming part of Letters Patent No. 233,163, dated October 12, 1880.

Application filed July 14, 1880. (No model.)

*To all whom it may concern:*

Be it known that I, HERMÉNÉGILDE PRÉFONTAINE, of the city of Troy, county of Rensselaer, and State of New York, have invented a new and useful Improvement in Torches, of which the following is a specification.

My invention relates to improvements in that class of staff-torches which are suspended by means of a pivotal connection made at each side of the torch with the spreading bail-arms constituting the frame between which it swings, and which also have a pivotal connection with the end of staff, around which the torch and frame may rotate.

My invention consists in the manner of forming from one continuous piece of wire the spreading bail-arms in which the lamp swings, and by bending the wire where the bail attaches to the staff to form a series of superimposed helical coils or loops, and which are arranged with reference to each other so as to surround a mandrel-rod upon the end of the staff, and thus produce from the same piece of wire which forms the bail-arms a socket or bearing for the staff-mandrel, around which the torch may rotate, the object of my invention being to simplify the construction and cheapen the cost of making the torches without sacrificing durability and adaptability.

In the accompanying drawings, forming a part of this specification, there are three figures illustrating my invention, in all of which the same reference-letters are used to designate the same parts.

Figure 2:
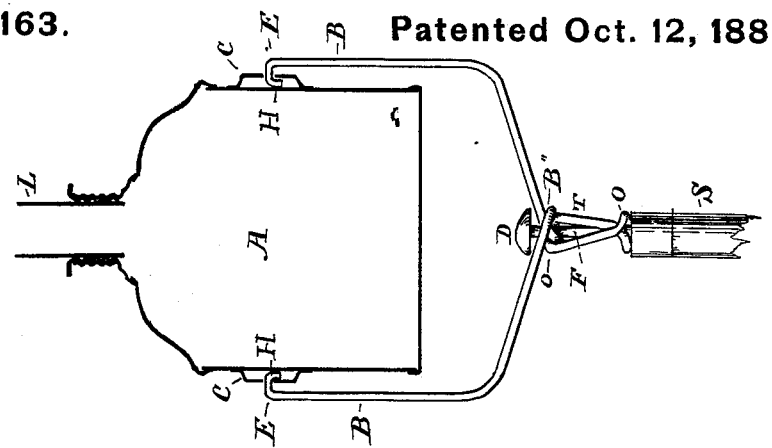
Figure 3:
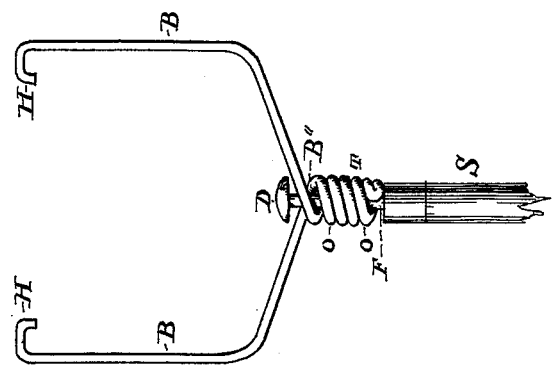
Figure 1:
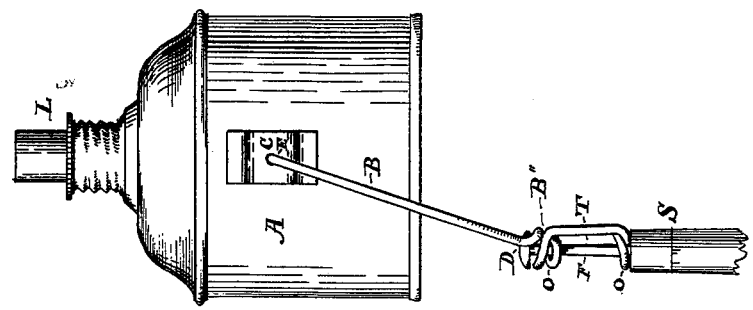

Figure 1 shows a side elevation of a torch and staff-handle, illustrating a top and bottom helical loop bent in the wire which forms the bail-arms where they lap past each other at the bottom, with the upper and lower coils or loops formed on the same wire in continuity, and at a sufficient vertical distance apart to produce a socket or bearing for the staff-mandrel, and by means of which the torch and frame may rotate on the staff. Fig. 2 shows a vertical section taken through the center of the torch, illustrating the manner of hooking the bail-arms at their ends into a sheet-metal offset produced upon the torch sides by means of an eye formed in the offset. Fig. 3 illustrates a hooked bail-frame removed from the torch, and in which a series of helical coils are bent in the bail-frame at its bottom to form a socket-bearing for the staff-mandrel.

The several parts composing my invention are designated by letters of reference, and described as follows: The letter A denotes the torch-lamp containing the wick-tube L; the letter S, the torch-handle broken off at its lower end. The bail-frame is shown at B, and as having upon the end of each of its arms the hook H, and the latter is shown in Fig. 2 as hooked into the eyes E, formed in the sheet offset C upon the side of the lamp. At the bottom of the bail-frame B, and where the wire composing the latter laps past itself, as shown at B″, there are formed a series of vertically-imposed helical loops or coils, O O, with sufficient distance between those formed next to the bail-frame and those or that at the bottom of the series to form a socket-bearing for the staff-mandrel, by means of which loops or coils around the mandrel on the staff the torch may rotate. Instead of one or two loops or coils at the top of the socket-bearing and one or more at the bottom, connected by a downward-extension of the same wire in continuity, as shown in Figs. 1 and 2, by using a longer piece of wire to form the bail-frame and the looped or coiled socket-bearing for the staff-mandrel, a series of loops or coils in contact may be formed, as shown in Fig. 3, and in which, between the top and bottom loops or coils shown in Figs. 1 and 2, there is arranged an intermediate series of loops or coils. At D there is designated a button or boss attached to the top of the mandrel to secure the torch-frame and torch to the staff.

I do not limit my invention to the number of loops or coils to produce a socket-bearing for the staff-mandrel, around which the torch-frame and torch may rotate, for one or more coils or loops bent in the bail-frame wire at the top of the socket-bearing, and in continuity from the same wire one or more loops or coils at the bottom, with sufficient space between them to form a socket-bearing for the mandrel, will answer the same purpose and in the same manner.

I am well aware that a wire bail-frame, broadly considered, is not new, and that my invention is limited to the manner of forming the bail-frame and socket from the wire, and the combination of the latter, as shown, with a pin and boss on the staff, around which the frame and torch may rotate.

Having thus described my invention, what I claim, and desire to secure by Letters Patent, is—

1. In a torch, the wire bail-frame B, forming the arms in which the torch swings, and provided with the loops or coils O O, produced in the lapping and downward extension of the frame-wire, and which loops or coils serve as a socket-bearing, in which, upon the end of the staff, the torch may rotate, as shown and described.

2. In a torch, the combination of the wire frame B, having the coils or loops O O arranged upon a continuation of the same wire below where lapped to form the frame-arms, between which the torch swings, and the mandrel F, arranged upon the end of the torch-staff, with the button D upon the end of the mandrel to secure the latter within the loops or coils, and to form a socket-bearing with the latter, in which the torch may rotate upon the staff and mandrel, as shown and described.

3. In a torch, the combination of a wire bail-frame, B, extended downwardly by a continuation of the same wire forming the frame, to produce a socket-bearing for the staff by means of the loops O O, formed in the wire, and the mandrel F upon the staff, with the hooks H H upon the ends of the bail-arms and the eyes E E in the offset C, for the purposes described and set forth.

Signed at Troy, New York, this 12th day of July, 1880.

HERMÉNÉGILDE PRÉFONTAINE.

Witnesses:
JOHN S. HYMAN,
CHARLES S. BRINTNALL.